March 29, 1966 P. R. WHEELER 3,242,576
MEASURING INSTRUMENTS
Filed Oct. 17, 1963 2 Sheets-Sheet 1
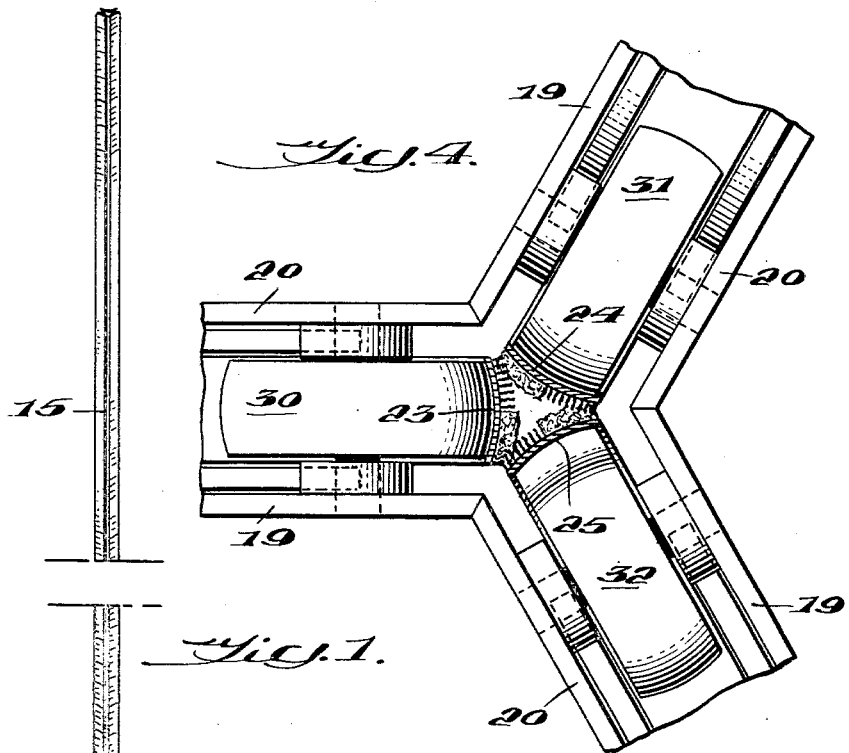
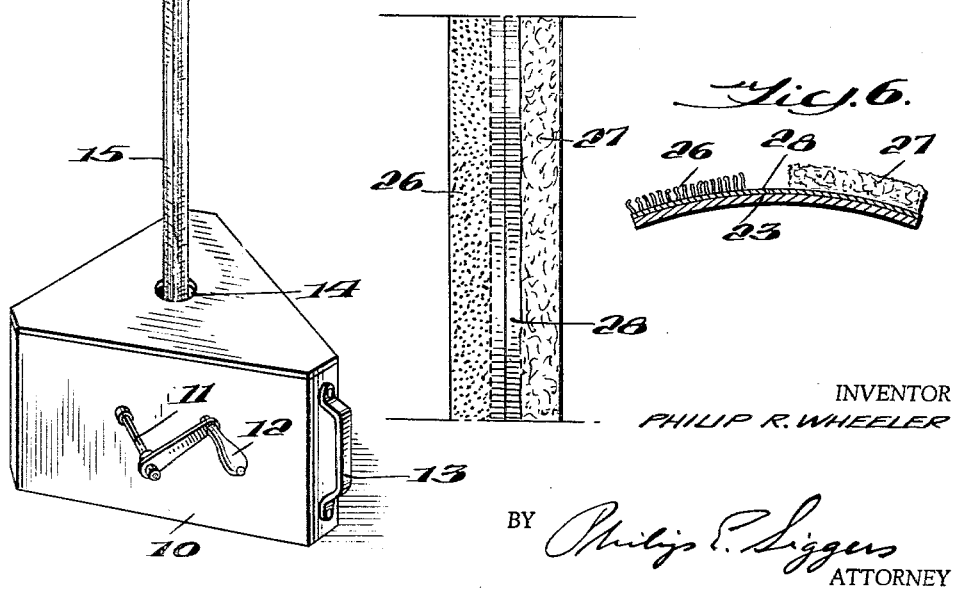
INVENTOR
PHILIP R. WHEELER
BY *Philip E. Siggers*
ATTORNEY March 29, 1966  P. R. WHEELER  3,242,576
MEASURING INSTRUMENTS
Filed Oct. 17, 1963  2 Sheets-Sheet 2
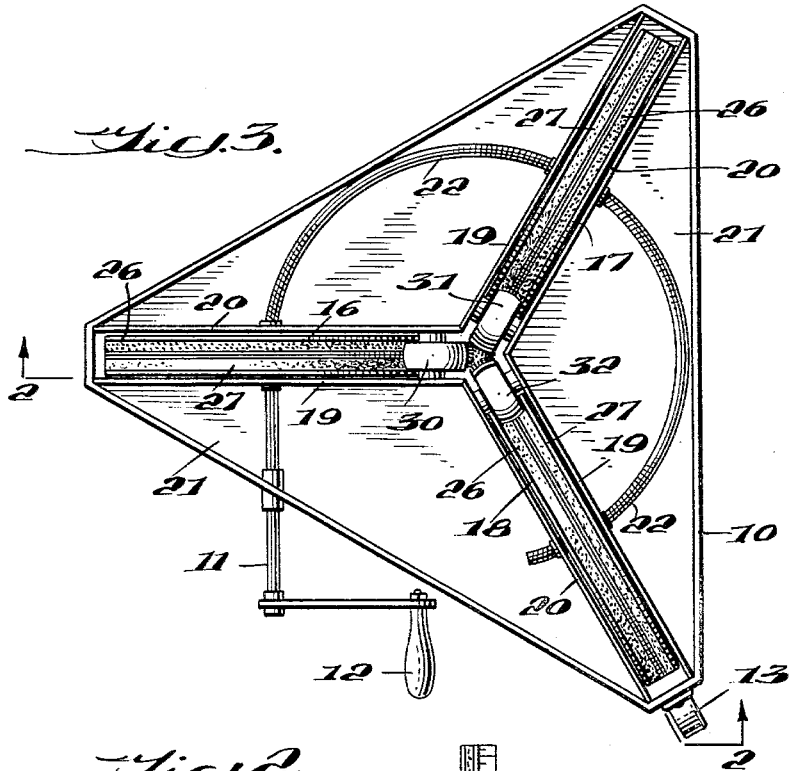
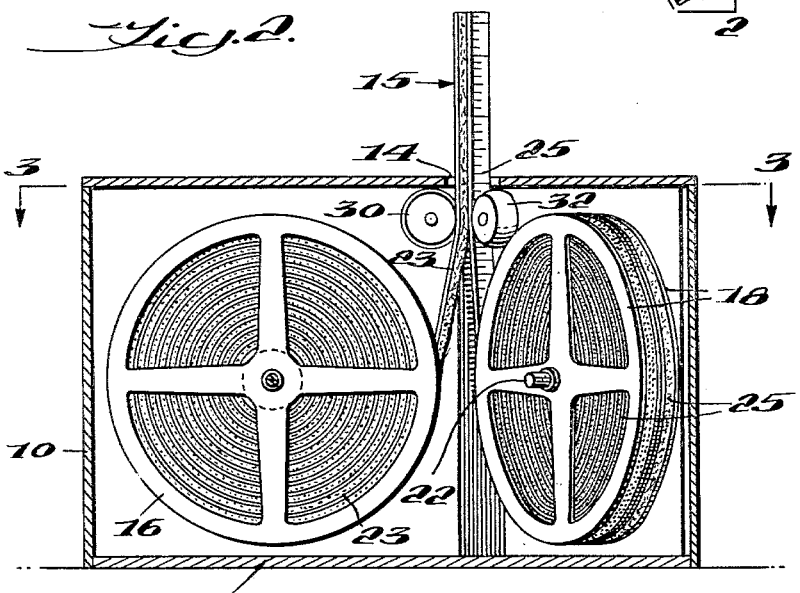
INVENTOR
PHILIP R. WHEELER,
BY *Philip E. Siggers*
ATTORNEY United States Patent Office 3,242,576
Patented Mar. 29, 1966

3,242,576
MEASURING INSTRUMENTS
Philip R. Wheeler, 2616 Jefferson Ave., New Orleans, La.
Filed Oct. 17, 1963, Ser. No. 316,854
7 Claims. (Cl. 33—74)

This invention relates to measuring instruments and among other objects, aims to provide a practicable device for measuring the height of objects, for example trees. A further object is to provide a portable measuring instrument capable of being carried by one man and operated manually. A more specific object is to provide a measuring device which is very compact, occupying little space when in transportable condition but capable of erecting a substantially rigid vertical structure thirty feet tall, or even taller, and then dismantling that structure and withdrawing its components to the confines of a small casing or housing. Other objects will be apparent from the following description of a preferred embodiment of the invention.

In the accompanying drawings forming a part of this specification,

FIG. 1 is a perspective view of the instrument with the measuring structure extended for making a measurement;

FIG. 2 is is a cross section on line 2—2 of FIG. 3;

FIG. 3 is a horizontal section on line 3—3 of FIG. 2;

FIG. 4 is a fragmentary plan view of the rollers which press the ribbons or tapes together, the ribbons being shown in cross section;

FIG. 5 is a fragmentary view in elevation showing the back or underside of one of the ribbons; and FIG. 6 is a cross section through one of the ribbons, shown enlarged.

Referring particularly to the drawings, FIG. 1 shows a casing or box 10 for enclosing substantially all the working parts except for a crankshaft 11 and handle 12, both of which may be removed when the device is being transported or is in storage. A handle 13 fixed to the casing wall facilitates carrying the device. The casing may be made of plywood but for durability should be of magnesium, aluminum or any suitable light-weight alloy. The top of the casing has a central aperture 14 large enough to permit the measuring structure 15 (to be described) to rise from within the casing without contact with the aperture walls.

Supported within the casing 10 are at least three reels or spools 16, 17, 18 all of the same diameter. While four reels could be used, it is advantageous to provide only three, as will presently be clear. The reels are disposed 120° apart (FIG. 3) and rotate about horizontal axes. If three reels only are used, the casing 10 should be generally triangular, as shown, with the reels extending from near the center of the casing nearly to the outer corners, which are squared off for practicality. Each reel is set between and journaled on two flat vertical plates 19, 20 that are fixed to the bottom 21 of the casing (not shown) or may be fixed to a separate board or sheet (not shown) that sits inside the casing, resting on bottom 21. The arrangement last described is desirable in that it makes possible lifting the reel assembly out of the casing, once the crankshaft 11 has been disconnected and the top of the casing removed. The crankshaft is secured to the center of reel 16 and a flexible shaft 22 connects reel 16 with reels 17 and 18, so that all three reels turn together in either direction. In lieu of the flexible shaft, other shaft-and-gear arrangements may be employed, as will be obvious.

The reels 16, 17, 18 are storage means for tapes or ribbons 23, 24, 25 respectively. These ribbons are preferably commercial steel tapes and are concavo-convex in cross section (FIG. 6). At least one ribbon of the set, and preferably all three, are marked on one surface with graduations of units of measurement. When measuring trees, these units would be feet, or meters and decimeters; for smaller objects, the ribbons may be graduated in feet and inches. Because of their construction, the ribbons are flexible and may be readily wound up on or unwound from their reels, but they are highly resistant to transverse stresses.

My invention is based on the temporary uniting of the ribbons to make a substantially rigid measuring structure as shown in FIG. 1. The preferred means for making possible the temporary adherence of the ribbons is a commercial pile fabric known as "Velcro," a nylon (superpolyamide) fabric. In this connection, see the De Mestral Patents Nos. 2,717,437 and 3,009,235. As there disclosed, "Velcro" fabric is of two complementary types, one a fabric having a multitude of tiny integral hooks projecting from one face, the other face being plain; the second a fabric having an extremely high tufted fiber on one face, the other face being plain. The hooks of the first-mentioned fabric when pressed against the tufted fibers of the second fabric effect a strong adherence of the two fabrics, yet they may be pulled apart and re-adhered over and over again, without noticeable impairment of strength.

As shown in FIGS. 4 and 6, each ribbon has two "Velcro" fabric tapes 26, 27 adhesively secured to the back, i.e., the ungraduated face. "Duco" cement may be used for this purpose. The "Velcro" tapes 26, 27 extend side by side for the length of the ribbons, tape 26 being made from the hooked fabric identified above and tape 27 being made from the tufted fabric. FIG. 5 shows the two tapes side by side with a narrow space 28 separating them. FIG. 6 shows the hooked tape 26 on the left, the tufted tape 27 on the right.

To make the mechanism operative, the three ribbons are led off their reels and are passed between rollers 30, 31, 32 (FIGS. 2, 3, 4) which are supported for rotation between plates 19 and 20 and slightly above the tops of the reels. These rollers may be ball-bearing and they have crowned peripheries as shown, to accommodate the ribbons, which are concavo-convex. The width of the rollers is slightly less than the width of the ribbons. The rollers are set very close together and force the tape-carrying sides of the ribbons into adherence, see FIG. 4. The area where the three rollers are almost in contact is directly below the aperture 14, so that the measuring structure formed from the adhered ribbons rises, as the crank is turned, from the interior of the casing without contact with the walls of the casing. The three ribbons unite with their concave surfaces outermost and form an erect structure which is non-flexible and which displays on at least one face, preferably on all three faces, indicia showing the height of the structure. When the reels are turned in the opposite direction, the ribbons are pulled apart by the superior power of the turning reels and are wound up thereon.

The illsutrated ribbons are identical in the arrangement of the "Velcro" tapes, that is, each ribbon carries two "Velcro" tapes of the two types described above. This arrangement is not necessary. One ribbon, for example ribbon 26, may have a single hooked "Velcro" tape on its back; the second ribbon 27 may have the tufted "Velcro" tape, and the third ribbon 28 must then have a hooked strip on one side and a tufted strip on the other (exactly as illustrated in FIG. 5), to make adherence of three ribbons possible.

Based on present knowledge, I believe that the "Velcro" material is the best adherent strip that can be used for the purpose described; however, it is within the scope of this invention to provide magnetic measuring tapes or ribbons which adhere to each other back to back, as described above, yet may be separated when wound up on reels or spools. It is possible to make tape having two layers of magnetic material running side by side for the length of the tape, one layer positive, the other negative, so that three tapes may adhere to each other when brought into juxtaposition, as in FIG. 4. Because of the expense of making it, the use of magnetic tape is not preferred.

While the described measuring instrument is easily carried by one man and operated by hand, it is within the scope of this invention to provide a much larger instrument for measuring tall trees, operated by a portable gasoline motor, for example; and in such a case, it may take two men to carry the instrument from a truck to the base of a tree that is to be measured.

Other variations from the described instrument will occur to those skilled in the art, and I do not wish to be limited by the foregoing description but only by the appended claims, which define the invention.

What I claim is:

1. In combination, a portable mechanism including a support, at least three reels mounted on said support for rotation about separate horizontal axes, and an operator-controlled mechanism for rotating all the reels simultaneously at the same speed in the same direction; a graduated ribbon windable on and unwindable from each reel; the ribbons when unwound contacting each other back to back; and flexible fabric means adhered to the backs of the ribbons and adapted on mere contact with each other to cause the ribbons to temporarily unite, as they are unwound from the reels, to form an erect, self-supporting structure useful for taking vertical measurements; said means yielding to the power of the mechanism to permit the ribbons to separate when winding up the ribbons on the reels.

2. In combination, a support; more than two reels mounted on said support and disposed in separate vertical planes; means controlled by an operator for turning the reels simultaneously at the same speed in the same direction; a flexible ribbon windable on each reel; and a strip of material fixed to the back of each ribbon which has an outer surface or texture that is non-adherent to the ribbons but is adherent on mere contact with the complementary strips fixed to the other ribbons; the reels when unwinding moving the ribbons into such positions that said strips contact and adhere to form a relatively stiff, self-supporting structure which rises above the reels vertically to make possible the taking of vertical measurements above the plane of said support.

3. A method of erecting a measuring device which comprises marking at least one of at least three flexible ribbons with units of measurement; attaching a fabric to the back sides of said ribbons extending the length thereof, said fabric being capable of adhering to itself by mere pressure contact but being incapable of adhering to the ribbons by such contact; delivering the ribbons to a single area in such a manner that the ribbons are united longitudinally through said fabrics, thereby forming a single structure; and continuing to feed the ribbons to said area to elongate said structure to the desired length for the measurement to be made.

4. A device for measuring the height of objects comprising, in combination, a support; three reels mounted on said support so as to rotate in generally vertical planes 120° apart; a crank fixed to one of the reels, and means connecting that reel with the other two reels, so that all three reels are rotatable at the same speed in the same direction when the crank is turned; a ribbon windable on each reel; at least one of the ribbons being marked with units of measurement; a fabric secured to each ribbon on the surface which is outermost when the ribbon is wound on the reel, said fabric being adherent to the fabric secured to the other two ribbons but being non-adherent to a ribbon by mere contact; means carried by the support above the discharge sides of the reels and acting to bring the ribbons together as they are unwound from the reels, thus forming automatically a measuring structure which rises vertically above the support and which is composed entirely of the three ribbons; the reels when turned to wind up the ribbons causing the adhered ribbons to separate at points between the reels and said means carried by the support.

5. The invention defined in claim 4, wherein the ribbons are concavo-convex in cross section, and said means carried by the support consist of three crowned rollers rotatable about horizontal axes, the rollers being respectively in the planes of the reels with their tops above the tops of the reels; the width of the rollers being slightly less than the width of the ribbons and the crown of the rollers fitting the concave faces of the ribbons.

6. A measuring instrument consisting of three joined but separable graduated ribbons each of which is capable of being wound up on a reel; three equal-sized reels for receiving the respective ribbons; means to support the reels for rotation; an operator-controlled mechanism for winding and unwinding said reels simultaneously and synchronously; the ribbons each carrying on its back a strip of material which is flexible and firmly united to the ribbon, and which is adherent on mere contact with strips of complementary material on the other ribbons; the adherence of said strips being strong enough to hold the three ribbons firmly together, when unwound, to form a self-supporting, erect structure, but such adherence yielding to the superior force exerted by the operator-controlled reels during winding up of the ribbons on the reels.

7. A manually operated mechanism capable of winding up and storing at least three flexible ribbons, and capable of delivering said ribbons simultaneously to an area that is centrally located relative to said mechanism; the combination therewith of a set of at least three ribbons, at least one of which is marked in units of linear measurement; a fabric secured to the length of each ribbon on one face thereof and having a multiplicity of tiny flexible integral hooks projecting outwardly from the ribbon on which the fabric is mounted, said hooks engaging and adhering to the similar hooks of a complementary fabric secured to the length of another ribbon of the set; said adherence being brought about by longitudinal contact of the fabrics with each other, in the area where the ribbons are delivered; the adhered ribbons forming an erect substantially stiff structure by means of which the heights of objects may be directly measured; said mechanism, when it is operated to wind up and store said ribbons, effecting automatically a separation of said adhered ribbons.

References Cited by the Examiner

UNITED STATES PATENTS

| 1,947,392 | 2/1934 | Guntermann | 33—137 X |
| 2,130,993 | 9/1938 | Dubilier | 189—34 X |
| 2,799,368 | 7/1957 | Alter | 189—34 X |
| 3,037,544 | 1/1963 | Cirves et al. | 33—138 X |

FOREIGN PATENTS

| 3,942 | 1909 | Great Britain. |
| 314,151 | 6/1929 | Great Britain. |

References Cited by the Applicant

UNITED STATES PATENTS 3,016,988   1/1962   Browning.

ISAAC LISANN, *Primary Examiner.*

J. D. BOOS, *Assistant Examiner.*